United States Patent [19]

Kimura

[11] Patent Number: 4,725,462

[45] Date of Patent: Feb. 16, 1988

[54] HEAT ACTIVATED INDICA ON TEXTILES

[76] Inventor: Toru Kimura, 950 Dovlen, Suite C, Carson, Calif. 90746

[21] Appl. No.: 871,392

[22] PCT Filed: Nov. 16, 1984

[86] PCT No.: PCT/US84/01884

§ 371 Date: Jul. 2, 1985

§ 102(e) Date: Jul. 2, 1985

[87] PCT Pub. No.: WO 86/02855

PCT Pub. Date: May 22, 1986

[30] Foreign Application Priority Data

Nov. 16, 1984 [WO] PCT Int'l Appl. .................. PCT/US84/01884

[51] Int. Cl.[4] .......................... A63H 3/02; B44F 1/10; C09D 11/10

[52] U.S. Cl. ........................................ 428/29; 283/97; 428/79; 446/369

[58] Field of Search .......................... 283/97; 346/221; 428/16, 29, 79; 446/147, 369; 503/221

[56] References Cited

U.S. PATENT DOCUMENTS

| | | | |
|---|---|---|---|
| 481,023 | 8/1892 | Grune, Sr. | 446/147 |
| 1,681,031 | 8/1928 | Forbis | 446/73 |
| 3,139,689 | 7/1964 | Quintel et al. | 283/97 X |
| 3,789,547 | 2/1974 | Chemarin | 428/100 X |
| 3,967,959 | 7/1976 | Goffe | 428/29 X |
| 3,989,279 | 11/1976 | Levy | 428/87 X |
| 4,028,118 | 7/1977 | Nakasuji et al. | 346/221 X |
| 4,509,280 | 4/1985 | Smith | 446/369 X |

FOREIGN PATENT DOCUMENTS

| | | | |
|---|---|---|---|
| 5183 | of 1906 | United Kingdom | 428/29 |

*Primary Examiner*—Henry F. Epstein
*Attorney, Agent, or Firm*—Albert O. Cota

[57] ABSTRACT

A woven fabric textile (10) in the form of a washcloth (12) or other fabric article having indica (16) in the form of a hidden message or symbol imprinted on its major surface. The indica is not visible to the naked eye under normal ambient temperatures. However, when the washcloth (12) is subjected to temperatures above 108 degrees F. (42 degrees C.), such as when emersed in bath water, the hidden indica (16) appears to the user. The indica (16) consists of a blend of conventional ink and a substance known by its tradename MATSUMIN THERMOCHROMATIC COLOR.

5 Claims, 3 Drawing Figures

HEAT ACTIVATED INDICA ON TEXTILES

TECHNICAL FIELD

This invention relates to printed matter having concealed information in general, and more particularly to a heat actuated indica applied to textiles that are commonly associated with a heat source such as towels used for bathing.

BACKGROUND ART

Hidden indica on household and other useful articles has been known and used in the past, however, this usage has been limited to the utilization of special chemicals or water actuated dyes that produce a permanent image. Some prior art systems with expensive or even caustic developers have been utilized in order to produce the hidden indica into a readily visible display. This method is often undesirable, particularly where the indica is to be used in conjunction with small children or if the product is distributed to the masses.

The use of water as a developer has also been practiced in prior art, however, the novelty is easily understood and lacks intrigue for a hidden message as it remains in the fabric until the medium is completely dried. Other methods transform the indica into a visible message by the application and combination of one element to another.

A search of the prior art did not disclose any patents that read directly on the claims of the instant invention. However, the following United States patents are considered related and indicative of the state-of the art:

| PATENT | INVENTOR | ISSUED |
|---|---|---|
| 3,989,279 | Levy | 2 November 1976 |
| 3,139,689 | Quintel, et al | 7 July 1964 |
| 481,023 | Gruene | 16 August 1892 |

The Levy patent discloses a hidden indica that is imprinted onto a carrier such as a tea bag with a wax base marking pencil, or a suitable non-toxic ink. The tea in the bag provides the staining agent so that introduction of the tea bag into boiling water will provide a stain which will discolor the carrier, or tea bag, with respect to the indica which does not discolor. This selective staining of one of the surfaces of the carrier provides the contrast between the indica and the carrier to make the indica visible. It will be noted that this prior art uses only surface staining with no color nor visible marking on the bag, allowing the area around the indica to create the contrast.

The Quintel patent discloses a method where indica is printed on a card with an invisible substance, such as a diluted lacquer more commonly known as invisible ink. Inasmuch as the substance is absorbed and is the same shade of coloring as the card, it is only rendered visible when a treatment is deployed to obtain a distinct contrast between the substance and the card, as an example, by moisture or liquid applied to the zone. This is accomplished in this invention using water as the moisturizing agent with a wick disposed over a receptacle extended therein for wetting and actuating the hidden indica. This indica is capable of being rendered visible by moisture applied onto the zone but also retains this visibility only while wet and remains in this state until the card upon which this is printed becomes dry by natural vaporization of the liquid into the air.

The Gruene patent discloses a transparent toy or puzzle picture with the image found on a surface of glass. The exterior is covered with powdered silicate of magnesium that is rubbed into the surface while the image or writing is covered with a material that does not allow the surface to be affected. This material is removed after the magnesium has etched the glass sufficiently. The indica is then visible when moisture is applied to the glass surface, such as being breathed upon by the user. Another application of Gruene's invention is using two similar glass plates treated in the above described manner with one placed on top of the other. This allows the moisture in the plate to remain with the picture or indica visible for a longer period of time than when applied to the top plate only.

DISCLOSURE OF THE INVENTION

The inventive heat activated indica on textiles is used primarily on bathroom toweling that is made from either natural or man made fibers. As indicated previously, indica on household and other useful articles becomes apparent when heat, moisture, or some other element is applied and stays in that condition permanently. This means that the only time the indica is actually hidden is prior to the application of the chemical or substance, or until the element is completely dried out.

It is, therefore, the primary object of this invention to have the article contain the special message hidden under normal ambient conditions and become apparent only at elevated temperatures. The indica is visual at all temperatures above a given point continuing to show until it is cooled below the critical temperature. This allows continual use of the item with the indica appearing and disappearing according to the actual temperature itself.

An important object of the invention allows the indica to be completely absorbed from view under normal or prevailing ambient temperatures. As the ink and design is an integral part of the surface, it is not obvious that any hidden message is on the surface until the application of heat. At that point colors completely change and the message or image is reproduced clearly and visibly to the user of the article.

Another object of the invention allows the use of a fabric article that is normally used with heat, such as bath textiles, specifically washcloths, hand towels, or bathmats. Washcloths, in particular, adapt themselves to the temperatures that cause the ink to change color allowing the complete disappearance of the indica at normal temperatures and at the elevated temperature the changing is completely obvious. This, however, is not limited to this type of textiles as this combination may be used in other items of apparel.

Still another object of the invention allows the use of this ink around humans. The compounds used are completely safe to be used and handled, as it does not contain any deleterious elements, as an example, some inks contain heavy metal, formaldehyde or fluorescent dyes.

Inasmuch as the invention is simple and easy to apply by conventional methods well known in the art, it is yet another object to provide an item that does not alter in any way its utility, but adds an extra dimension of value at only a slight increase in cost of fabrication.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
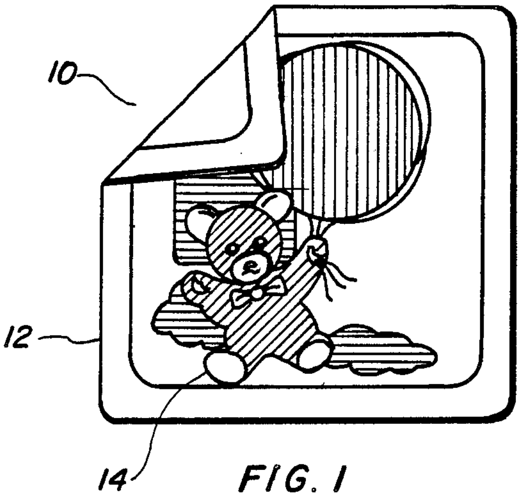
FIG. 1 is a plan view of the preferred embodiment with one corner of the towel folded over indicating the back surface.
Figure 2:
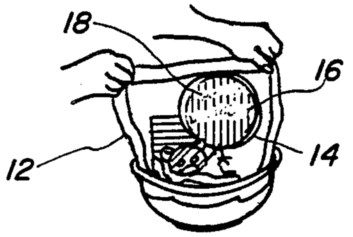
FIG. 2 is a partial isometric view of the drawing of the washcloth being emerged in a bowl of water with the indica beginning to appear as affected by the heat.
Figure 3:
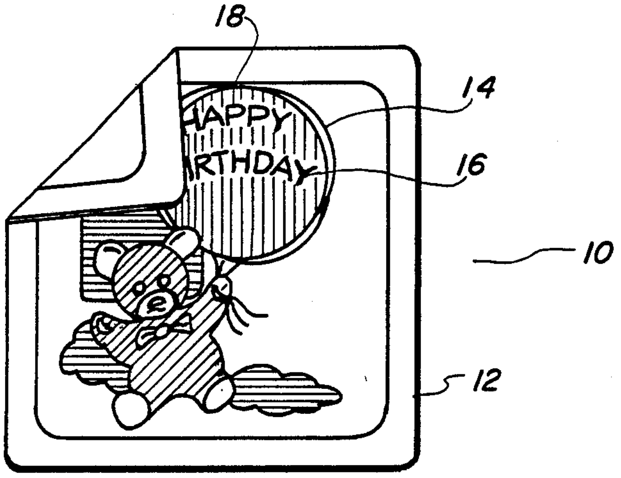
FIG. 3 is a plan view of the invention, as shown in FIG. 1, with the indica in place having changed color due to the elevated temperature.

The invention is presented in terms of a preferred embodiment that is comprised of a bath textile 10, which is made from a woven fabric material having a hem or a selvage around the edge. This textile 10 may be in the form of a washcloth 12, as depicted in FIGS. 1-3, a bathmat, bath towel, hand towel, dish cloth, or the like. This is not to limit the application of the invention to only the items described, as the utility of the hidden indica on a textile may be practiced on any fabric that is in communication with heat during its normal use. Additionally, the fabric may be woven from either natural or man made fibers.

As the preferred embodiment is directed to a washcloth 12, the size and shape are dictated by convention. One side of the washcloth 12 is considered the front or top, having a major surface upon which a design 14 is imprinted. This design 14 may be any ornamental decoration, preferably having a theme, and is visualized by the use of a different color than that of the background of the washcloth 12. The design 14 may be only a small portion of the surface, or may cover the entire area. The design 14 is applied to the major surface using any dye, stain, paint, or ink compatible with woven textile. This imprinting upon the surface may be accomplished by stenciling, screening, rolling, or the like, each method being well known in the art.

As the ornamental mark or design 14 is visible by the use of different colors or shades, they all contain a permanent coloring agent of some type. This difference in color may also be augmented by a tactile surface changing the weave in fabric or adding a substance that permanently alters the superficies position of the end fibers or loops. Although the preferred embodiment utilizes only a flat fabric, such as a washcloth this does not insinuate limitations of the inventions application on other fabrics and articles.

The invention further contains indica 16 infused into the article with thermo-chromatic ink 18. The indica 16 is positioned in such a manner as to be part of the design 14, but is hidden from view at normal prevailing ambient temperatures. The ink 18 may be deposited directly on the surface of the textile or may be added on top of the design 14, with no difference in the application. When the thermo-chromatic ink 18 is subjected to external heat, the color changes making the indica 16 visible to the naked eye. As this indica 16 is an integral part of the design 14, the hidden message appears only at elevated temperatures and disappears when the temperature is reduced beyond the temperature cross-over point. This integral design, therefore, allows an intriguing method of communication and indeed novelty to the user of the article. Various configurations of designs, forms, images, messages, etc., may be imparted throughout the surface.

The thermo-chromatic ink 18 used for the indica 16 consists of a blend of water, gum turpentine, neutralizer, pigment-resin color and a substance known by its tradename, "MATSUMIN THERMOCHROMATIC COLOR" which consists of 30% organic pigment, 30% polyacrylic ester emulsion, 30% water, 7% mineral spirits and 3% ethylene glycol. The ink consists of globular microcapsules having a diameter of from 0.01 to 0.03 millimeters that are not water soluable. The basic formulation of the ink utilizes known materials, which are published in the Japanese "Handbook of Existing Chemical Substances" as an example, the pigment is also used in the manufacture of thermosensitive recording paper known in the art. Of note, the inks do not contain any heavy metal, formaldehyde, or fluorescent dye and have been approved for manufacturing by the Japanese government. The indica 16 is applied with the ink 18 to the surface of the textile fabric 10 or the design 14 by methods such as silk screening, printing, or other procedures well known in the art.

The cross-over temperature of the ink 18 from one color to another is from 91 degrees F. (33 degrees C.) to 108 degrees F. (42 degrees C.) with one color visible below the temperature and the other color apparent at any temperature above. The ink 18 has the characteristic of being repeatable with the same phenomenon taking place each time the temperature is changed beyond the cross-over point. This feature allows the novelty of the product to be realized when made into bath related articles where normal temperatures are elevated above the cross-over point of the ink 18.

Other utility for this invention includes the application of the indica on clothing, and the like, where the normal use includes ironing or other application of heat. Additionally, the invention can be practiced on fabric covered articles such as stuffed toys. In this application, the entire fabric is treated with the thermo-chromatic ink or hidden indica may be infused into the fabric.

While the invention has been described in complete detail and pictorially shown in the accompany drawings, it is not to be limited to such details, since many changes and modifications may be in the invention without departing from the spirit and the scope thereof. Hence, it is described to cover any and all modifications and forms which may come within the language and scope of the claims.

I claim:

1. Textile articles with hidden indica activated by heat comprising:

(a) a textile article of woven fabric having a major surface defining the front of the textile article as viewed by the user made from natural or man made fibers, (b) a design on said major surface of the article impregnating the textile with a substance having a permanent coloring agent, and (c) indica infused into said textile article with thermochromatic ink integral with said design hidden at normal prevailing ambient temperatures and visually appearing when subjected to external heat said thermochromatic ink comprises in combination a blend of water, gum turpentine, neutralizer, pigment-resin color, and a substance consisting of 30% organic pigment, 30 % polyacrylic ester emulsion, 30% water, 7% mineral spirits and 3% ethylene glycol, said design is characterized by an ornamental mark providing a contrast in color of said article located in such a manner as to allow said indica to convey a message when visually manifested with said indica appearing between 90 degrees F. (33 degrees C.) and 108 degrees F. (42degrees C.) and visible at temperatures thereabove.

2. The invention as recited in claim 1 wherein said textile article of woven fabric is a washcloth.

3. The invention as recited in claim 1 wherein said textile article of woven fabric is a hand towel.

4. The invention as recited in claim 1 wherein said textile article of woven fabric is a bathmat.

5. The invention as recited in claim 1 wherein said textile article comprises a fabric covered stuffed toy.

* * * * *